United States Patent
Soininen et al.

(10) Patent No.: US 6,434,130 B1
(45) Date of Patent: Aug. 13, 2002

(54) SWITCHING CONTROL METHOD AND APPARATUS FOR WIRELESS TELECOMMUNICATIONS

(75) Inventors: Pekka Soininen; Mikko Rinne, both of Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/136,379

(22) Filed: Aug. 19, 1998

(30) Foreign Application Priority Data

Aug. 22, 1997 (GB) .............................................. 9717935

(51) Int. Cl.⁷ ................................................ H04Q 7/34
(52) U.S. Cl. ......................... 370/331; 370/335; 455/522
(58) Field of Search ................................ 370/331, 335; 455/522

(56) References Cited

U.S. PATENT DOCUMENTS

| | | | |
|---|---|---|---|
| 5,257,257 A | 10/1993 | Chen et al. ..................... 370/18 |
| 5,345,448 A | 9/1994 | Keskitalo .................... 370/95.3 |
| 5,349,630 A | 9/1994 | Sointula ....................... 379/58 |
| 5,408,504 A | 4/1995 | Ostman ....................... 375/354 |
| 5,410,733 A | 4/1995 | Niva et al. .................. 455/33.2 |
| 5,416,435 A | 5/1995 | Jokinen et al. ............. 327/113 |
| 5,420,889 A | 5/1995 | Juntti .......................... 375/346 |
| 5,426,670 A | 6/1995 | Leppanen et al. .......... 375/343 |
| 5,440,597 A | 8/1995 | Chung et al. ............... 375/200 |
| 5,483,668 A | 1/1996 | Malkamaki et al. ....... 455/33.2 |
| 5,491,718 A | 2/1996 | Gould et al. ................ 375/205 |
| 5,524,009 A | 6/1996 | Tuutijarvi et al. ......... 370/95.3 |
| 5,533,013 A | 7/1996 | Leppanen .................... 370/18 |
| 5,548,616 A | 8/1996 | Mucke et al. ............... 375/295 |
| 5,550,893 A | 8/1996 | Heidari ........................ 379/59 |
| 5,564,074 A | 10/1996 | Juntti ......................... 455/67.1 |
| 5,566,201 A | 10/1996 | Ostman ....................... 375/200 |
| 5,570,353 A | 10/1996 | Keskitalo et al. ............. 370/18 |
| 5,589,795 A | 12/1996 | Latva-Aho ................... 327/553 |
| 5,590,160 A | 12/1996 | Ostman ....................... 375/367 |
| 5,596,571 A | 1/1997 | Gould et al. ................ 370/335 |
| 5,654,980 A | 8/1997 | Latva-aho et al. .......... 375/208 |
| 5,659,598 A | 8/1997 | Byrne et al. ................ 455/436 |
| 5,703,873 A | 12/1997 | Ojanpera et al. ........... 370/332 |
| 5,710,974 A | 1/1998 | Granlund et al. .......... 455/33.2 |
| 5,715,279 A | 2/1998 | Laakso et al. ............... 375/224 |
| 5,774,809 A | 6/1998 | Tuutijarvi et al. .......... 455/437 |
| 5,809,399 A | 9/1998 | Tuutijarvi et al. ............. 455/63 |
| 6,311,075 B1 * | 10/2001 | Bevan et al. ................ 342/368 |

FOREIGN PATENT DOCUMENTS

| | | |
|---|---|---|
| EP | 0645940 A1 | 3/1995 |
| EP | 0 768 804 A2 | 4/1997 |
| WO | WO 95/35003 | 12/1995 |

OTHER PUBLICATIONS

United Kingdom Search Report for Application No. GB 9717935.2, Nov. 1997.

* cited by examiner

*Primary Examiner*—Melvin Marcelo
(74) *Attorney, Agent, or Firm*—Perman & Green, LLP

(57) ABSTRACT

A switching method for a wireless telecommunication system which comprises at least one first station and at least one second station, includes the following steps. At a first station the power level of a signal received from a second station is determined, said first and second stations being in communication. A first value for the power level of the signal to be transmitted from the first station to the second station is provided based on the determined power level of the signal received from the second station. At the second station the power level of the signal received from said first station is determined. A second value for the power level of the signal to be transmitted from the first station to the second station is provided based on said determined power level of the signal received from the first station. The first and second values are compared and based on said comparison it is determined, if said second station is to be switched.

23 Claims, 4 Drawing Sheets

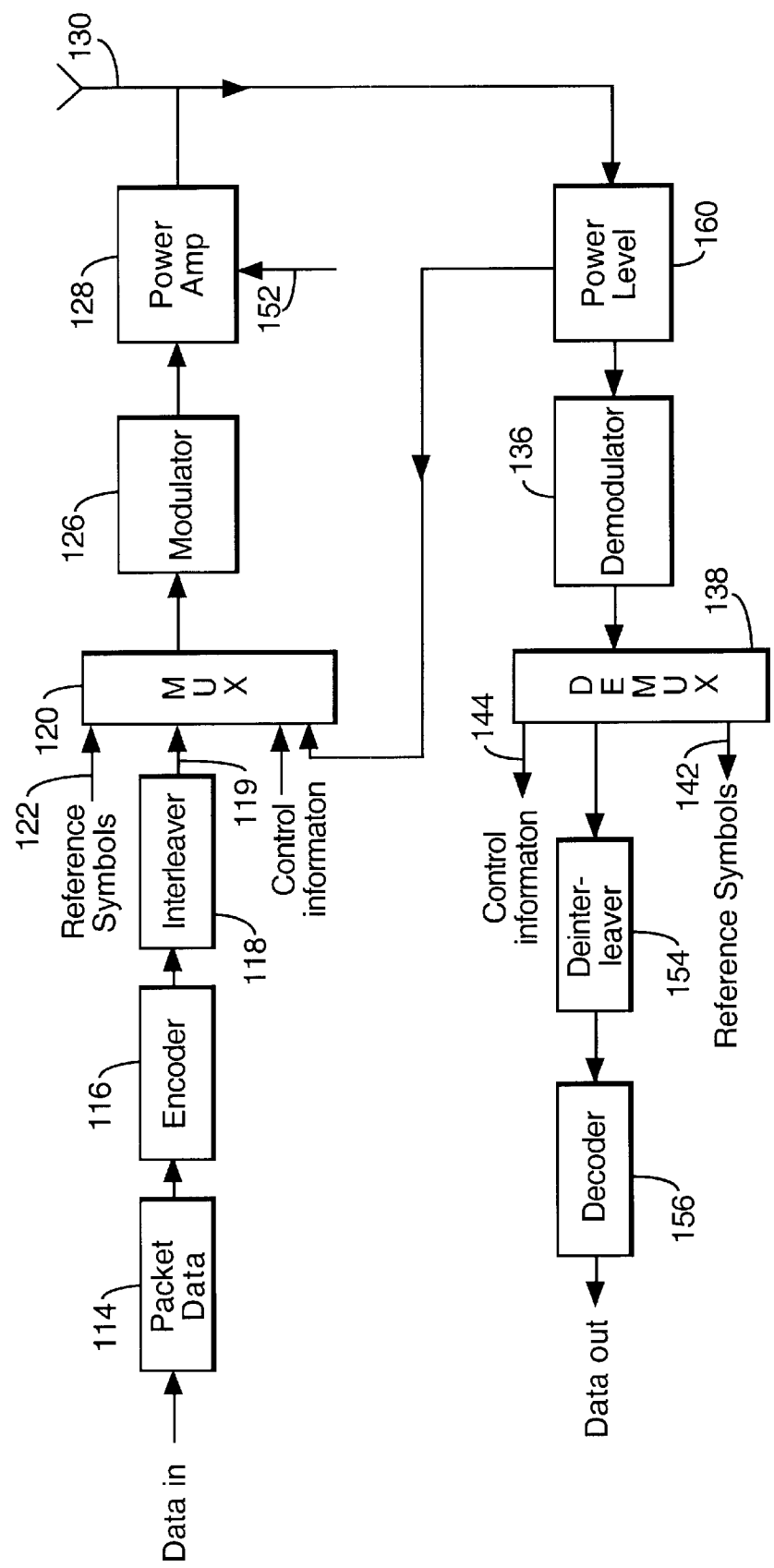

SWITCHING CONTROL METHOD AND APPARATUS FOR WIRELESS TELECOMMUNICATIONS

The present invention relates to a switching control method and apparatus for a wireless telecommunication system and, in particular, but not exclusively for a cellular telecommunications system.

The use of code division multiple access (CDMA) is currently being proposed for the next generation of cellular telecommunication networks. CDMA uses a digital spread spectrum multiple access technique which it is believed will allow the volume of traffic supported by a cellular telecommunications network to be increased. One of the problems of using CDMA techniques is that of power control. With CDMA systems, it is desired that all the signals reaching a given base transceiver station from all the mobile stations in the cell associated with that base transceiver station have the same level. This permits the number of simultaneous calls which can be supported at the same time to be maximised. In particular, if the level of the received signals from the mobile stations are of the same level, the signal to interference ratio of each signal received at the base transceiver station is minimised. If the signal from a given mobile station is received by the base transceiver station with too low a power level, the bit error rate will be too high to provide a reasonable quality of communication. On the other hand, if the level of the signal received from a given mobile station is too high, interference with the other mobile stations sharing the same channel is increased so that some of these other mobile stations may not achieve an acceptable quality of communication with the respective base transceiver station.

In one method which has been proposed, open loop power control and/or closed loop power control is used to determine the level at which a signal is to be transmitted from a mobile station. In open loop power control, the mobile station determines a value for the power of the signal to be transmitted to the base transceiver station based on the level of the signal received at that mobile station from the base transceiver station. Thus, the strength of the signal received by the mobile station from the base transceiver station is used by the mobile station to adjust the power of its own transmission. In other words, the stronger the signal received by the mobile station, the lower the power used by the mobile station to transmit to the base transceiver station.

In closed loop power control, the base transceiver station measures the power level of a signal received from a given mobile station. This measured power level is compared with a desired power level. Based on this comparison, the base transceiver station will send to the mobile station a power adjustment signal indicating to the mobile station the power level at which the mobile station should transmit signals to the base transceiver station.

In methods which use a combination of the closed loop and open loop power values to arrive at the desired power level, the power adjustment signal provided by the base transceiver station and the open loop estimate arrived at by the mobile station itself are both used to obtain the final value for the power level of the signal to be transmitted by the mobile station to the base transceiver station.

If the power control method uses closed-loop power control with short adjustment intervals, the control mechanism can react to fast-fading. Fast-fading is caused by destructive interference between different reflected paths of the same radio signal. It is highly frequency-selective, and therefore the fast-fading process between different radio frequencies is independent. Thus fading might occur at one frequency and not at another, even if the same paths are used. In frequency division duplexed (FDD) systems, where uplink (the link from mobile station to base station) and downlink (the link from base station to mobile station) transmissions are transmitted on different frequencies, closed-loop power control is required to be able to take the difference between link directions into account.

It is also proposed that some cellular telecommunication systems will use hard handover. In particular, it is believed that hard handover may be simpler to implement in practice with certain proposed applications of CDMA. Handover or handoff is when a mobile station stops communication with one base transceiver station and instead communicates with a different base transceiver station. Typically this occurs when a mobile station moves from one cell into another cell. Hard handover or handoff occurs when the mobile station is only in communication with one base station at a time. In other words, the connection with the first base transceiver station is severed before the connection with the second base transceiver station is made. This contrasts with soft handover or handoff where a mobile station can be in communication, at the same time, with several transceiver stations during the transferring process.

In known handoff or handover methods, the mobile station measures the received strength of reference signals transmitted by the base transceiver stations. The mobile station then sends a report back to the base transceiver station with which it is in communication reporting the signal levels of the reference signal received at the mobile station from that base transceiver station as well as the adjacent base transceiver stations from which it was able to receive the reference signals. Based on this report, the base transceiver station in combination with a mobile switching centre, will decide whether or not the mobile station should remain in communication with the current base transceiver station or whether it should be switched to another base transceiver station.

However, this method of achieving handover or handoff has the disadvantage that only the downlink signal (i.e. the signal from the base transceiver station transmitted to the mobile station) is taken into account. The frequency of the downlink signal is generally different from that used in the uplink signal (i.e. the signal transmitted from the mobile station to the base transceiver station). Accordingly, if there is fading in the uplink signal, but not in the downlink signal, handover will not occur, even if handover is in fact appropriate. Instead, the power control method outlined hereinbefore will try to compensate for the fading in the uplink signal by increasing the transmission power of the mobile station. This can cause unnecessary interference with mobile stations in neighbouring cells or indeed other mobile stations contained in the same cell.

It is therefore an aim of embodiments of the present invention to provide a method and apparatus which is able to reduce or at least mitigate the problems described hereinbefore.

According to one aspect of the present invention, there is provided a switching method for a wireless telecommunication system comprising at least one first station and at least one second station, said method comprising the steps of determining at a first station the power level of a signal received from a second station, said first and second stations being in communication; providing a first value for the power level of the signal to be transmitted from the first station to the second station based on said determined power level of the signal received from said second station; determining at the second station the power level of the signal received from said first station; providing a second value for the power level of the signal to be transmitted from the first station to the second station based on said determined power level of the signal received from the first station; comparing said first and second values and based on said comparison determining if said second station is to be switched.

This method is advantageous in that the comparison of the two values takes into account the path between the first station and the second station and the path between the second station and the first station. In other words, if the behaviour of the path in an uplink direction is quite different from that in a downlink direction, it is clear that one of the directions of communication is not performing well. If the performance is unsatisfactory, then switching of the second station can be implemented to try to achieve satisfactory communication in both the uplink and the downlink directions.

Preferably in the comparing step the difference between said first and second values is determined. Alternatively in the comparing step, the difference between the logarithms of the first and second values is determined. It is preferred that said second station be switched if said difference falls outside a predetermined range.

Preferably, the telecommunication system is a cellular telecommunication system. The second station is preferably a base transceiver station or a mobile station. It is most preferably a base transceiver station. The first station may be a mobile station or a base transceiver station. Preferably, the first station is a mobile station. The cellular telecommunication network preferably uses code division multiple access. In a particularly preferred embodiment of the present invention, wide band code division multiple access is used. Wide band code division multiple access allows different band widths to be used in the communication between the base transceiver station and the mobile station in dependence on the bit rate of the data to be transmitted.

Preferably, in a packet data transmission mode, packet data can be transmitted between the first and second stations in a dedicated channel. Additionally or alternatively, in a packet data transmission mode, packet data can be transmitted between said first and second stations on a common channel. It is preferred that the method include the step of selecting either the common channel or the dedicated channel in dependence on the length and/or the frequency of the data packets. It is advantageous to use a dedicated channel when the data packets are long and/or arrive frequently. However, it is advantageous to use the common channel when the data packets are short and arrive infrequently. In this way, the maximum amount of traffic can be supported by the cellular telecommunication system.

Preferably, when said second station switching is activated, the first station ceases to communicate with said second station and starts to communicate with a different second station. In the context of telecommunications, handover or handoff thus occurs. The communication between the first station and the second station may be terminated before communication commences between the first station and said different second station. In the context of cellular telecommunication systems, hard handover or handoff thus occurs. However, it should be appreciated that in some embodiments of the present invention, soft handover or handoff may occur. The use of hard handover is particularly preferred with embodiments of the present invention which use the packet data transmission method in which common and dedicated channels are used. This is because it is difficult to have a random access channel which would be in soft handover. In embodiments of the invention, fast switching between a common channel and a dedicated channel may be used. Soft handover for the dedicated channel would require a more complicated protocol which may be undesirable.

Preferably, when said second station switching is activated, the second station breaks its connection with said first station and makes a new connection with said first station. The new connection may only be successively re-established when an acceptable quality of communication is possible.

Preferably, the method includes the steps of measuring at the first station the strength of reference signals received from a plurality of said second stations, including the second station with which the first station is currently in communication; and terminating the connection between the first station and the second station with which the first station is currently in communication if a stronger signal is received from another of said second stations. Thus, two different criteria can be used for determining whether or not the first station is to communicate with a different second station. In preferred embodiments of the present invention, if either of the criteria is satisfied, then the first station will communicate with a different second station. Preferably second station switching of the type where a connection with the mobile station is broken and re-established will only take place if the result of the comparison of the first and second values is indicative of a failure in the path between the second station and the first station and the current second station is providing the strongest signal, then the connection between the first station will be broken and then subsequently re-established.

Preferably if the comparing step determines that the first and second values are such that the second station should be switched, switching of the second station is delayed until the first and second values have maintained values indicative that switching should take place for a predetermined length of time.

Alternatively, switching can take place immediately that the comparing step determines that the first and second values are such that the second station should be switched.

Preferably said second station is able to determine if the first station is moving and the predetermined time is set in dependence on the length of time required by the second station to determine if the first station is moving. The second station may be able to measure the speed of the first station and the predetermined length of time may be set in accordance with the ability and/or accuracy of the second station to measure the speed of the first station.

Alternatively, if the comparing step determines that the first and second values are such that the second station should be switched, said first station and said second station only provide signals required to determine said first and second values and if the first and second values continue to be such that the second station should be switched, said second station is switched. If the comparing step determines that the first and second values are such that second station switching is no longer required, the connection with the second station may be resumed.

According to a second aspect of the present invention, there is provided a switching method for use in a cellular telecommunication system comprising at least one first station and at least one second station, the method comprising the steps of estimating for the first station a closed loop power level for transmission of a signal from the first station to a second station; estimating for the first station an open loop power level for a signal to be transmitted from the first station to the second station; comparing said estimated open loop and closed loop power levels, wherein if the difference between said estimated values falls outside a given range, second station is switched.

According to a third aspect of the present invention, there is provided a first station for use in a wireless telecommunication system, said first station being arranged to communicate with a second station, said first station comprising means for estimating the power level of a signal received from said second station; means for receiving a value for the power level of a signal to be transmitted from the first station to the second station from said second station; and means for comparing the value determined at said first station with the value transmitted from the second station and based on said comparison, said first station is arranged if appropriate to send a signal to said second station indicative that second station switching is to take place.

For a better understanding of the present invention and as to how the same may be carried into effect, reference will now be made by way of example to the accompanying drawings in which:

FIG. 2b shows a block diagram of elements of a base transceiver station embodying the present invention;

Figure 1:
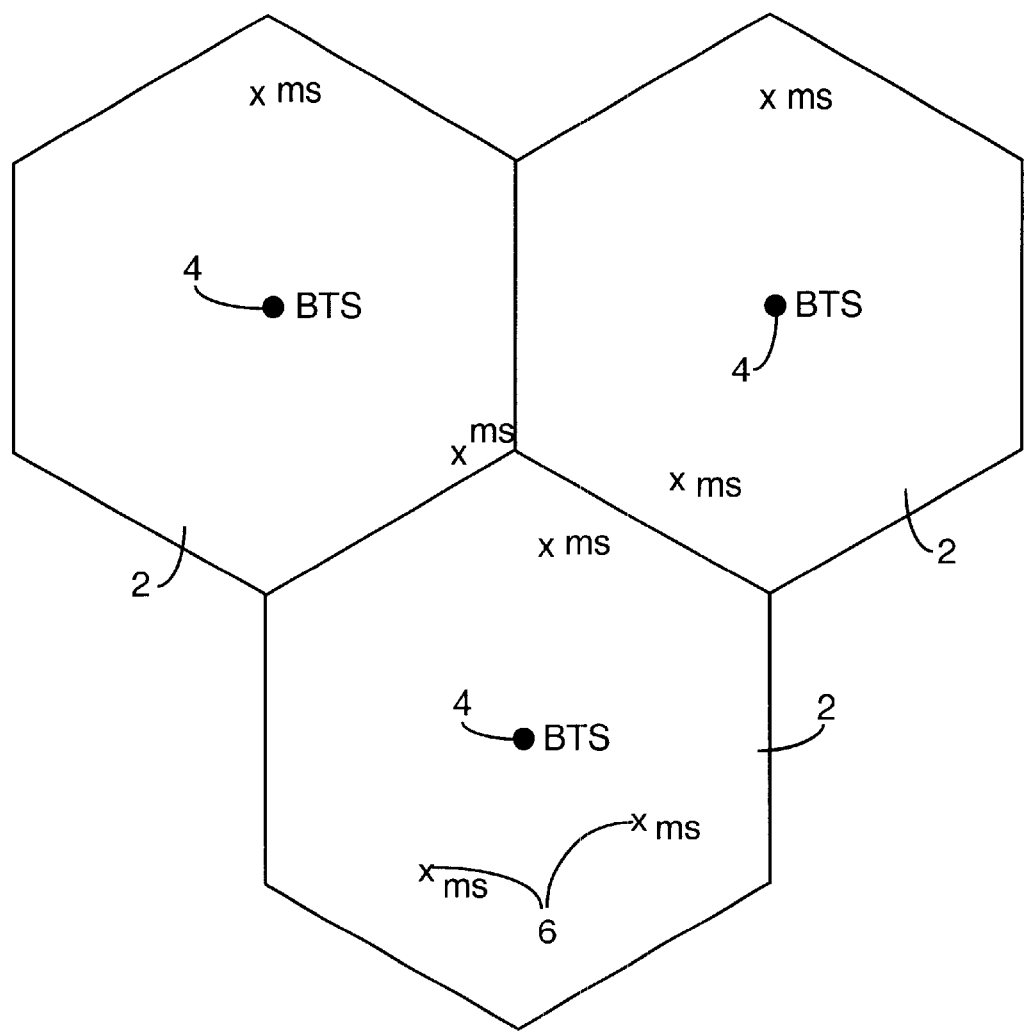
FIG. 1 shows a schematic diagram of part of a cellular telecommunications network incorporating base transceiver stations and mobile stations.

Reference will first be made to FIG. 1 in which three cells 2 of a cellular mobile telecommunication network are shown. Each cell 2 is served by a respective base transceiver station (BTS) 4. Each BTS 4 communicates with mobile stations (MS) 6 such as mobile telephones or the like which are located in respective cells. Thus, each base transceiver station 4 is arranged to transmit signals to and receive signals from the mobile stations 6 located in the cell associated with the given BTS 4. Likewise each MS 6 is able to transmit signals and receive signals from the respective BTS 4. Generally, radio waves are used in the communication between the base transceiver stations 4 and the mobile stations 6.

Figure 2A:
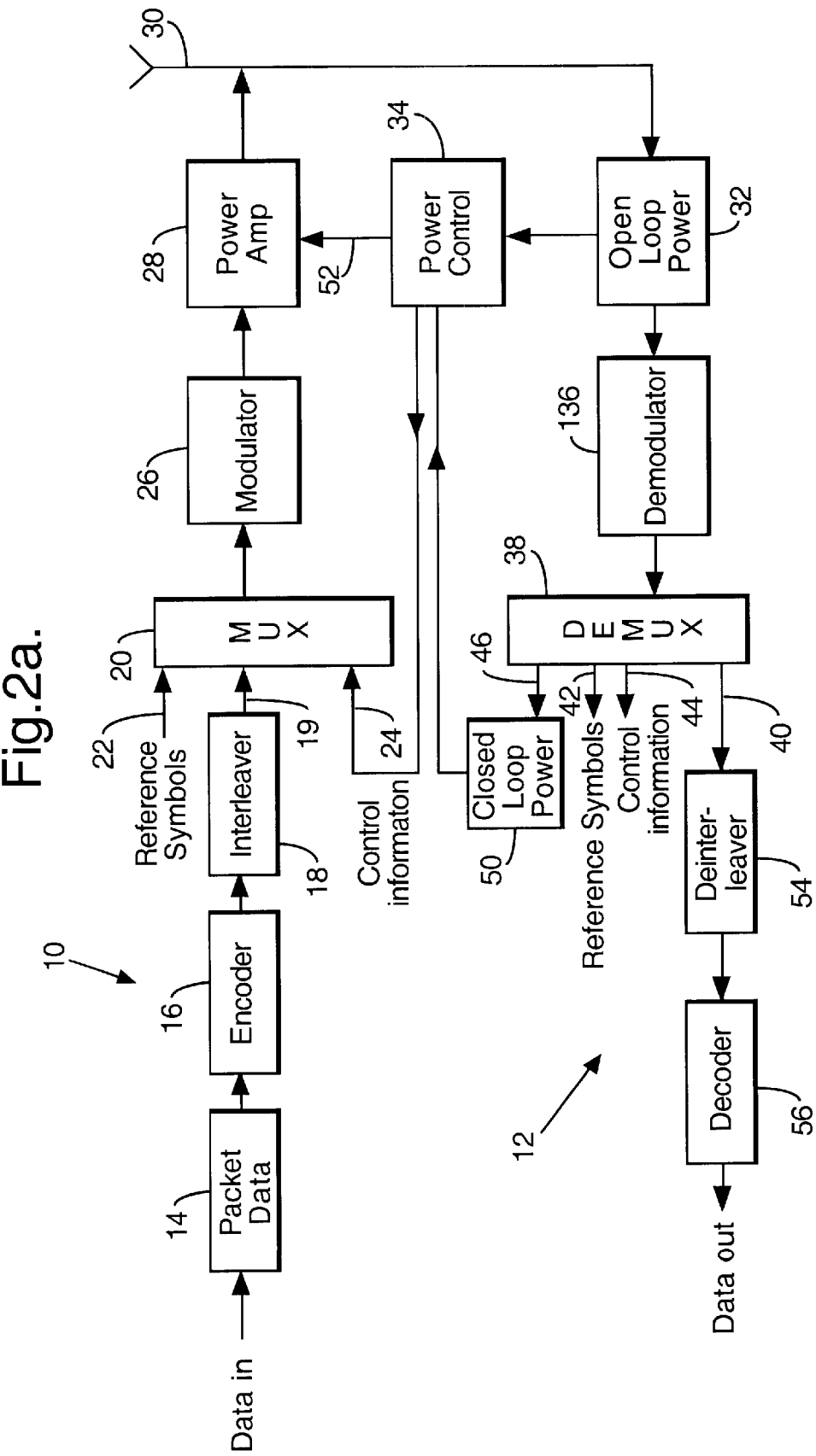
FIG. 2a shows a block diagram of elements of a mobile station embodying the present invention.

Reference will now be made to FIGS. 2a and 2b. FIG. 2a is a block diagram which schematically shows elements of a mobile station 6 whilst FIG. 2b is a block diagram which schematically shows elements of a base transceiver station 4. Referring first to FIG. 2a, the mobile station 6 includes a transmitting circuit 10 and a receiving circuit 12. The transmitting circuit 10 will first be described. The transmitting circuit 10 has a packet data block 14 which will be described in more detail hereinafter. Packet data block 14 will, if it is determined that packet data is to be transmitted by the mobile station 6, determine whether the data is to be transmitted on a common channel or a dedicated channel. Thus, the output provided by packet data block 14 will include the received data as well as control information as to the channel to be used to transmit the packet data. If the data is not packet data, the data simply passes through the packet data block 14.

An encoder 16 is provided to receive the data. The data may be a stream of bits or symbols. That data can represent for example a speech signal, a video signal or some other data signal and will be generally referred to as "data". The data may be packetised. Any of these types of data may be packetised. The encoding technique used by the encoder 16 will depend on the specification of the cellular telecommunication network with which the mobile station is intended to form a part. The encoded signal generated by the encoder 16 is output to an interleaver 18 which interleaves the data. The interleaver 18 thus provides an output 19 which consists of the encoded and interleaved data. That output 19 is connected to an input of a multiplexer 20. The multiplexer 20 is also arranged to receive an input 22 which provides reference symbols or the like. The multiplexer 20 also receives an input 24 which provides control information. The output of the multiplexer 20 provides a signal which can include the encoded and interleaved data as well as reference symbols or the like and control information. The signal output from the multiplexer 20 is input to a modulator 26 which modulates the signal. The modulated data is transmitted with a power level set by power amplifier 28. The signal is transmitted through the channel generally defined by the air medium between the mobile station 6 and the base transceiver station 4 with which it communicates. An antenna 30 is used to transmit and receive signals. The controlling of the level of the signal power output by the power amplifier 28 will be discussed in more detail hereinafter.

The receiving circuit 12 will now be described. The signal which is transmitted from the base transceiver station 4 across the channel is received by the receiver circuit 12 via antenna 30. The receiver circuit 12 has an open loop power block 32. This open loop power block 32 is arranged to measure the power level of a reference in the received signal. Typically, the pilot symbols are used as the reference. As will be discussed hereinafter, the open loop power block 32 uses the measured level of the signal received from the base transceiver station 4 to provide one estimate of the power level which should be used to transmit signals to the base transceiver station. The output of the open loop power block 32 is coupled to the input of a power control block 34, which will be discussed in more detail hereinafter.

The received signal is then output from the open loop power block 32 to a demodulator 36 which removes the carrier wave component and demodulates the received signal. The demodulated signal is input to a demultiplexer 42 which separates the received signal into four parts. In particular, the demultiplexer 38 separates out the data which is output on output 40. Reference symbols are output on output 42 whilst control information is output on output 44. On the fourth output 46 of the demultiplexer 42, information relating to the power level of a previous signal received by the base transceiver station is provided. This will be discussed in more detail hereinafter. The fourth output 46 is connected to a closed loop power block 50 which provides a second estimate for the power level to be used to transmit a signal to the base transceiver station. This second estimate is based on the signal level measured at the base transceiver station of a previous signal received by the base transceiver station from the mobile station.

The output of the closed loop power block 50 is output to power control block 34. Based on the estimated open loop power calculated by open loop power block 32 and the estimated closed loop power calculated by closed loop power block 50, the power to be used for the signal to be transmitted by the MS is calculated by power control block 34 which provides a power control signal 52 to the power amplifier 28 which sets its amplification. It should be appreciated that any suitable algorithm can be used in order to calculate the power level of the signal to be transmitted by the mobile station.

The data output by the demultiplexer 38 is deinterleaved by the deinterleaver 54. The deinterleaved data is then passed to a decoder 56 where it is decoded and then output.

Reference will now be made to FIG. 2b which shows schematically elements of a base transceiver station 4. As will be appreciated, the base transceiver station 4 will include elements similar to those included in the mobile station 6 described in relation to FIG. 2a. Those elements which are similar to those of the mobile station 6 are referenced by the same reference numeral with the prefix "1". The function of the packet data block 114 the encoder block 116, the interleaver block 118, the multiplexer 120, the modulator 126, the power amplifier 128, the antenna 130, the demodulator 136, the demultiplexer 138, the deinterleaver 154 and the decoder 156 will not be described again. The functions performed by these blocks are similar to those performed in relation to those elements shown in FIG. 2a.

The base transceiver station includes a power level block 160 which is able to measure the power level of a signal received by the base transceiver station 4 from a given mobile station. The data received from the mobile station is output to the demodulator 136. However, information on the measured power of the signal received from the mobile station is output to the multiplexer 120. Thus this information will be transmitted to the MS. This information may form part of the control information although it is shown in FIG. 2b as a separate input to the multiplexer 120. It is this same information which will subsequently be used by the closed loop power block of the mobile station shown in FIG. 2a.

It should be appreciated that the block diagram shown in FIGS. 2a and 2b are schematic and do not include all of the various stages which in practice would be present in mobile stations 6 and base transceiver stations 4.

Figure 3:
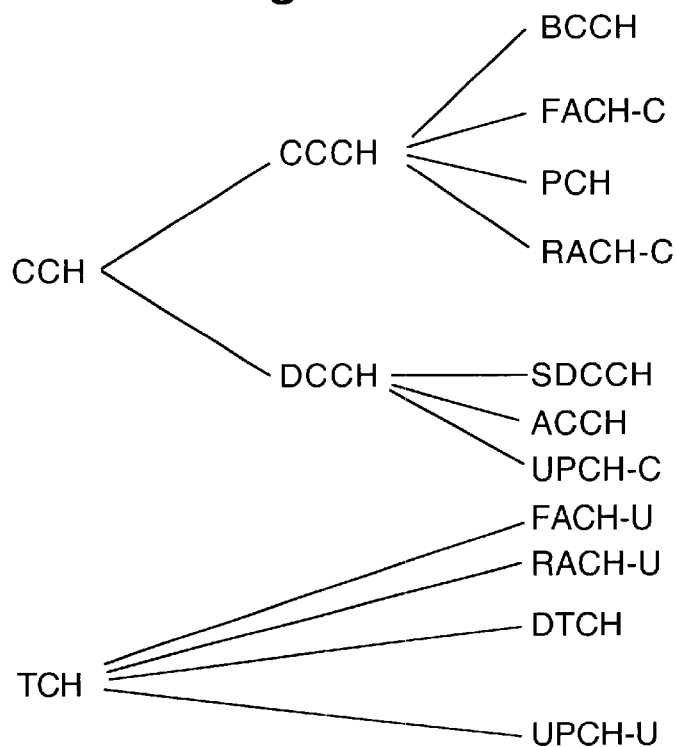
FIG. 3 shows a channel structure used in embodiments of the present invention.

The function of the packet data blocks 14 and 114 will now be described in more detail. Embodiments of the present invention are particularly applicable to wide band CDMA (W-CDMA). One proposed feature of a W-CDMA system is that it is possible to use a number of different coding rates depending on the bit rate of the data to be transmitted. A logical channel structure which is used with W-CDMA (as well as normal CDMA) is shown in FIG. 3. As can be seen from this figure, the channels can be divided into two types, control channels (CCH) and the traffic channels (TCH). The control channels are generally used for control and synchronising data. The control channels comprises common control channels (CCCH) and dedicated control channels (DCCH). The common control channels include: a broadcast control channel (BCCH) which is used in the downlink communications from the base station to the mobile stations in its vicinity; a forward access control channel (FACH-C) which provides control information; a paging channel (PCH) which contains paging signals from the base transceiver to the respective mobile stations in the case of a network originating call; and a random access control channel (RACH-C) which is used only in the uplink communications where the mobile stations request the allocation of a channel for communication with the respective base transceiver station.

There are three dedicated control channels (DCCH). The first is a stand alone dedicated control channel (SDCCH) which is used for setting up the services required by the user. The second channel, the associated control channel (ACCH) is used in the downlink to convey commands from the base station. The third channel is the user packet control channel (UPCH-C). These commands may include the setting of the power level of the mobile station for the closed loop power estimate. In the uplink, this channel may convey the status of the mobile station such as the received signal levels which the mobile station receives from the various base transceiver stations.

The traffic channels are generally used to convey speech and data traffic. There are four different types of traffic channel. The first is a dedicated traffic channel (DTCH) which carries non packetised data. The second traffic channel is the user data dedicated user packet channel (UPCH-U). The third channel is the user data forward access channel (FACH-U) whilst the fourth channel is the user data random access channel (RACH-U).

The following two methods can be used for the transmission of packet data. Firstly, the packet data can be transmitted by a common channel transmission method or alternatively, packet data can be transmitted using a dedicated channel transmission method. With the method using the common channel transmission method, closed loop transmission power control is not possible in that the common channel will be used by more than one mobile station or by the base station for communicating with more than one mobile station. As such, the transmission power will be greater than the required minimum for a particular mobile station. However, the common channels are efficient in that the radio resources are not unnecessarily tied up as transmission is only done in the necessary time intervals. This increases the number of calls which can be simultaneously supported.

In contrast, the dedicated channels (D-UPCH) are inefficient in that the channel is tied up for the transmission of one user's data even when there is no data to be transmitted. In other words, a single user is assigned a given dedicated user packet channel. However, the dedicated channels are efficient in that the data is transmitted at the minimum required transmission power because closed loop transmission power control is applied. This is because a link between a single mobile station and the base transceiver station is established for that channel and no other mobile station is able to use that channel or receive information from the base transceiver station on that same channel for a given time period.

Thus, in preferred embodiments of the present invention, an adaptive data packet transmission method is used which adaptively selects the appropriate channel according to the signal traffic characteristics. In particular, the packet data blocks 14 and 114 consider the signal traffic and if it contains packetised data make a decision as to if the packets are short and whether or not they are to be transmitted infrequently. If the packet data blocks 14 and 114 determine that the packets are short and transmitted infrequently, they are then transmitted by the common channel method. For the downlink direction, the FACH-U is used as a common data packet channel whilst in the uplink direction the RACH-U is used as the common data packet channel. In alternative embodiments of the present invention, a common traffic channel may be provided in order to carry the packet data in the common channel mode of operation.

If it is determined by the packet data blocks 14 and 114 that the packets are long, then a dedicated traffic channel (UPCH-U) is used which is released from the particular user when the data has been transmitted. Finally, the packet data blocks 14 and 114 also determine whether or not the packets are transmitted frequently. If it is determined that this in fact occurs, regardless as to whether or not the packets are short or long, then a dedicated channel is selected such as the UPCH-U and the dedicated channel remains dedicated to the particular mobile station and associated base transceiver station until the packet data blocks 14 and 114 determine that data packets are no longer arriving frequently. It should be appreciated that the control channels associated with the common channels are the common control channels.

Likewise, dedicated control channels are associated with the dedicated user packet channel.

It should be appreciated that the channel structure shown in FIG. 3 is by way of example only. In some embodiments additional channels may be provided whilst in other embodiments different channels to those shown in that Figure may be provided. Some of the channels shown in FIG. 3 may not be present in other embodiments.

Figure 4A:
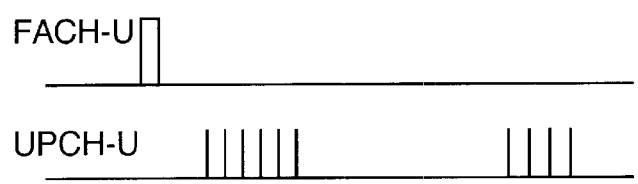
FIG. 4 shows the uplink and downlink channels for data packet transmission.
Figure 4B:
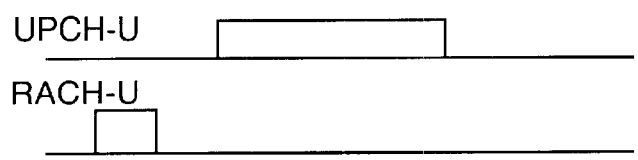

Reference is now made to FIG. 4 which illustrates an example of the adaptive packet data transmission method. In particular, FIG. 4a shows the down link situation. The first line of FIG. 4a illustrates the case where the data packets are small and infrequent. The data packets together with associated control information are transmitted on the FACH-U. The second line of FIG. 4a illustrates the case where the packets are small but frequent. Accordingly the dedicated channel, UPCH-U, is used. FIG. 4b shows the uplink situation with the first line of FIG. 4b showing case where the data packet is large and so the dedicated channel UPCH-U is used. Finally, the second line of FIG. 4b shows the case where the data packets are small and infrequent. Accordingly, the random access channel is used for the transmission of this packet data.

The power control method used in embodiments of the present invention will now be described in more detail. In particular, embodiments of the present invention use open loop power control and closed loop power control in order to formulate two estimates for the required transmission power. The open loop power estimate which is provided by open loop power block 32 will first be considered. With this method, each mobile station attempts to estimate the power loss which occurs when the signal travels from the base transceiver station to the mobile station. In CDMA cellular telecommunication networks, all base transceiver stations in a region transmit a pilot signal on the same frequency. These pilot signals are used by all mobile stations for initial synchronisation. Additionally, the mobile stations will measure the power level of the pilot signal from the base transceiver station to which they are connected as well as the strength of the pilot signals received from the other base transceiver stations. The open loop power block 32 of the mobile station thus records the received strength of the signal of the pilot signal and uses the strength of the received pilot signal at the mobile station to provide a first estimate of the power level to be used with the signals to be transmitted from the mobile station to the base transceiver station.

As mentioned hereinbefore, with CDMA systems, it is desired to keep the strength of the received signals at the base transceiver station at a generally constant level, for all the mobile stations in a given cell. Accordingly, the stronger the received pilot signal at the mobile station, the lower the transmitter power (or amplification provided by amplifier 28) of the MS. This is because the reception of a strong pilot signal from the base transceiver station is indicative that the mobile station is either very close to the base transceiver station or that there is a good path between the base transceiver station and the mobile station. This means that less transmitter power is required by the mobile station in order to produce the desired signal strength at the base transceiver station.

This open loop power control method may, over a period of a few microseconds, adjust the transmission power for the mobile station downwardly, when necessary, thus attempting to prevent the mobile station transmitter power from being too high.

The open loop power control for a mobile station can be expressed as follows:

$$Pt_{CL}=\min((C)-(Pr),Pmax)$$

where $Pt_{OL}$ is the estimated open loop transmission power, Pr is the received pilot signal strength, C and Pmax are system specific parameters. Pmax represents the maximum power which can be used for transmission by the mobile station. C represents a constant which may take into account various parameters such as the respective gains of the mobile station and the base transceiver station etc. All the variables are in logarithmic units (dBM). An alternative definition for $Pt_{OL}$ is as follows.

$$Pt_{OL}=\min((C)-x(Pr),Pmax))$$

where $0 \leq x \leq 1$.

It is preferred that $C=C1+C2$ where C1 represents system specific parameters relating to the base station whilst C2 represents the system specific parameters relating to the mobile station.

The closed loop power control method will now be described. The closed loop control block, which is provided in the base transceiver station, is arranged to measure the strength of a signal which is received by the base transceiver station from the mobile station. The measured strength of the signal received by the base transceiver station and, more particularly, the measured signal to noise ratio of the received signal from the mobile station is compared, at the base transceiver station, with a desired signal to noise ratio for the given mobile station. Based on this comparison, a power adjustment command is sent to the mobile station from the base transceiver station. If Pt is the mobile closed loop base transmission power at instant t, then $P(t+T)_{CL}=P(t)+\text{delta}(t)$ where $P_{CL}$ is the estimated closed loop power for the next period and delta(t) denotes the power control step and T stands for the power control interval. Typically, this will be 0.625 milliseconds. delta (t) represents the amount by which the power can be reduced or increased by in one step and may for example be of the order of 1 decibel. This is a system specific paramater.

We would point out that the actual power with which a signal is transmitted by the mobile station can be calculated using the open loop, closed loop or any particular combination of the two.

The actual transmission power used by the mobile station in some embodiments of the present invention is defined as a function of the open loop power estimate, the closed loop power estimate and the power used in the previous transmission by the mobile station i.e. $P_t=f(P_{t-T},P_{OL},P_{CL})$.

In preferred embodiments of the present invention, the power level of the signal to be transmitted from the mobile station to the base transceiver station is determined based on a combination of the open loop and closed loop methods.

As mentioned hereinbefore, when a mobile station moves from one cell to another or is in a border region between two cells, handoff or handover may be required. Handoff or handover is when communication between the mobile station and one base transceiver station ceases and the mobile station then starts to communicate with a different base transceiver station. In preferred embodiments hard handover is preferred as this does not cause problems when the adaptive data packet transmission method is used.

In embodiments of the present invention, two separate methods are used to determine whether or not handoff should occur. If the criteria for either of these methods is satisfied, then handoff will occur. In the first method, the estimated transmission powers calculated by the open loop method and the closed loop method are used. In particular, the difference between the open loop estimate ($P_{OL}$) and the closed loop estimate ($P_{CL}$) is calculated as follows:

$$F=Pt_{OL}-Pt_{CL}.$$

The open loop and closed loop powers may be expressed logarithmically. Large absolute values of F are indicative that either of the uplink or the downlink is facing strong attenuation due to fading and that the base station should be switched. Switching can be achieved by performing handover or handoff to an adjacent base transceiver station or by terminating the old connection and establishing a new connection by using random access etc. The new connection may not be subject to the same problems of fading. The switching of the base station is referred to as base station switching.

Consider that the mobile station has a set of base stations with which it communicates. These base stations are BTS1 ... BTSN. The estimated path loss to each of the base stations is L1 ... LN. Take the situation where the mobile station has a user packet channel connection with BTS1 and that the mobile station is also under closed loop fast power control by the BTS1. In other words, the power control of the signal to be transmitted by the mobile station takes into account the closed loop power control method. The mobile station calculates the value of F using the equation defined above. If $a<F<b$, then the mobile station maintains the user packet channel connection with BTS1. If on the other hand $F \leq a$, then the mobile station can make a determination that the uplink channel is facing the severe fading and thus can switch to one of the other base transceiver stations BTSM which has a smaller uplink path loss.

If on the other hand $F \geq b$ then the mobile station ascertains that the downlink channel is facing severe fading and can therefore switch to the base transceiver station which has a smaller downlink path loss.

a and b are selected in accordance with the particular parameters of the cellular network and may indeed vary from cell to cell or even over time within the same cell to take into account a changing radio environment. However it is possible that a and b may be constant for a given mobile station. a may be negative whilst b may be positive. a and b may, but not necessarily have the same magnitude.

The second method used to initiate handoff or handover is generally known and in this method, the mobile station measures the strength of the pilot signals received from the base station with which it communicates as well as the surrounding base transceiver stations. The mobile station sends a control signal to the base transceiver station indicating the relative strength of the received signals from the various base transceiver stations in the vicinity. The base transceiver station, the mobile switching station and/or the mobile station will effectively make the decision as to whether or not handoff or handover is to occur. Handoff or handover will occur generally if the mobile station receives a stronger signal from a different base transceiver station to that with which the mobile station is currently communicating. This of course is dependent on the respective base transceiver station having sufficient traffic capacity to support the mobile station. Other criteria may be used in determining whether or not handoff or handover is to occur. For example, traffic volumes in one cell set by a particular base transceiver station may be high so that mobile stations which can communicate with base transceiver stations of different cells with lower traffic may be transferred to the other base transceiver stations, even though the stronger signal may still come from the existing base transceiver station.

In embodiments of the present invention, both of these methods are used in order to achieve handoff or handover.

In embodiments which use the two methods for achieving handover, if $F \leq a$, then this is indicative of uplink channel fading. The mobile station will then measure the pilot signal from all of the base transceiver stations from which it is able to receive a signal, excluding the current base transceiver station to which the mobile station is currently connected. The base transceiver station which provides the strongest pilot signal is selected and the mobile station will establish a connection with that base transceiver station, breaking the connection with the current base transceiver station.

The condition $F \leq a$ may occur from time to time when for example the mobile is moving rapidly. In these circumstances the fast-fading will be of short duration and the power control will not need to compensate for these short-lived fast fadings. There will generally be no problem in these circumstances. In this case, handover will be entirely based on the second described method for handover. However, to distinguish between short duration fast fading and longer lasting fast fading, a timer is incorporated. F must satisfy the condition $F \leq a$ for a predetermined period t, before handover is initiated. In one modification to this embodiment, the base station is able to measure the speed of the mobile station. If the base station determines that the mobile station is moving, the base station will be able to determine that the fast fading is likely to be caused by this movement and that the problem is likely to be shortlived. The predetermined period t is selected so as to take into account the ability and accuracy of the base station to measure the speed of the first station.

Alternatively, if $F \leq a$, the mobile station can cease transmission and adopt a mode where only open-loop and closed loop power control signalling are supported and observe if the condition $F \leq a$ continues to occur. If it does handover is initiated. If not, communication with the current base station is maintained.

These same criteria may be used where $F \geq b$ if the first method for initiating handover is used on its own.

If $F \geq b$, this is indicative of downlink channel fading. However, downlink fading is taken into account by the second method for determining handover. Accordingly, if the second method does not cause handover to be initiated, the first method will not cause handover. Instead, the connection with the current base transceiver station will be broken and re-established at a later time.

In some embodiments the connection will be broken if $F \leq a$ or $F \geq b$ if handover cannot take place due to, for example the new selected base station being too busy and the communication with the current base station is poor. Attempts will be made to re-establish the connection from time to time to see if the situation has changed. If the problem of signal fading no longer exists, then the connection will be re-established or if appropriate handover may take place.

In some embodiments, the connection may be broken, when appropriate and immediately re-established. This may for example be used with systems which uses a number of different frequencies for uplink transmission and downlink transmission—in this case, the new connection would use different frequencies.

In some embodiments of the present invention, the first method for initiating handover will be used on its own. In those embodiments, when $F \geq b$, handover will occur in the same manner as outlined in relation to the situation where $F \leq a$.

Whilst the embodiment of the present invention has been described in relation to a W-CDMA system, embodiments of the present invention may also be used in other types of cellular telecommunication networks using time division multiple access, frequency division multiple access, frequency hopping CDMA, CDMA or any other suitable type of access technique.

The embodiment of the present invention has been described in the context of a cellular telecommunications network. However embodiments of the present invention may be implemented in any suitable wireless communication system.

Embodiments of this invention can be modified so as to be used to control the power and operation of the base transceiver station.

It should be appreciated that whilst the present invention has been described in relation to the situation where data packets are transmitted between the base station and mobile station, the present invention is also applicable to any suitable form of communication between the base transceiver station and base station. Additionally, whilst the present invention has been described in the preferred embodiment in relation to a situation where hard handover occurs, it should be appreciated that embodiments of the present invention may be applicable to systems which use soft handover.

What is claimed is:

1. A switching method for a wireless telecommunication system comprising at least one first station and at least one second station, said method comprising the steps of:

determining at a first station the power level of a signal received from a second station, said first and second stations being in communication;

providing a first value for the power level of the signal to be transmitted from the first station to the second station based on said determined power level of the signal received from said second station;

determining at the second station the power level of the signal received from said first station;

providing a second value for the power level of the signal to be transmitted from the first station to the second station based on said determined power level of the signal received from the first station;

comparing said first and second values and based on said comparison determining if said second station is to be switched.

2. A method as claimed in claim 1, wherein in the comparing step the difference between said first and second values is determined.

3. A method as claimed in claim 1, wherein in the comparing step, the difference between the logarithms of the first and second values is determined.

4. A method as claimed in claim 2, wherein said second station is switched if said difference falls outside a predetermined range.

5. A method as claimed in claim 1, wherein said telecommunication system is a cellular telecommunication system.

6. A method as claimed in claim 5, wherein said second station is a base transceiver station or a mobile station.

7. A method as claimed in claim 5, wherein said first station is a mobile station or a base transceiver station.

8. A method as claimed in claim 5, wherein said cellular telecommunication network uses a code division multiple access technique.

9. A method as claimed in claim 8, wherein said code division multiple access technique is a wide band code division multiple access technique.

10. A method as claimed in claim 1, wherein in a packet data transmission mode, packet data can be transmitted between said first and second stations on a dedicated channel.

11. A method as claimed in claims 1, wherein in a packet data transmission mode, packet data can be transmitted between said first and second stations on a common channel.

12. A method as claimed in claim 11, further comprising the steps of selecting either the common channel or the dedicated channel to transmit said packet data in dependence on the length and/or frequency of the data packets.

13. A method as claimed in claim 1, wherein when said second station switching is activated, said first station ceases to communicate with said second station and starts communication with a different second station.

14. A method as claimed in claim 13, wherein said first station terminates its communication with said second station before it commences communication with the said different second station.

15. A method as claimed in an claim 1, wherein when said second station switching is activated, the connection between the said first station and the second station is broken and new connection is subsequently made between said first and second stations.

16. A method as claimed in claim 1, comprising the steps of:

measuring at the first station the strength of reference signals received from a plurality of said second station including the second station with which the first station is currently in communication; and terminating the connection between the first station and the second station with which the first station is currently in communication if the stronger signal is received from another of said second stations.

17. A method as claimed in claim 13, wherein if the comparison of the first and second values is indicative of a failure in the path from the second station to said first station and the current second station is providing the strongest signal, then the connection between the first and second station will be broken and then subsequently re-established.

18. A method as claimed in claims 1, wherein if the comparing step determines that the first and second values are such that the second station should be switched, switching of the second station is delayed until the first and second values have maintained values indicative that switching should take place for a predetermined length of time.

19. A method as claimed in claim 18, wherein said second station is able to determine if the first station is moving and the predetermined time is set in dependence on the length of time required by the second station to determine if the first station is moving.

20. A method as claimed in claim 1, wherein if the comparing step determines that the first and second values are such that the second station should be switched, said first station and said second station provide only signals required to determine said first and second values and if the first and second values continue to be such that the second station should be switched, said second station is switched.

21. A method as claimed in claim 18, wherein if the comparing step determines that the first and second values no longer indicate that the second station should be switched, the connection between the first and second stations is continued.

22. A switching method for use in a cellular telecommunication system comprising at least one first station and at least one second station, the method comprising the steps of:

estimating for the first station a closed loop power level for transmission of a signal from the first station to a second station;

estimating for the first station an open loop power level for a signal to be transmitted from the first station to the second station;

comparing said estimated open loop and closed loop power levels, wherein if the difference between said estimated values falls outside a given range, second station is switched.

23. A first station for use in a wireless telecommunication system, said first station being arranged to communicate with a second station, said first station comprising:

means for estimating the power level of a signal received from said second station;

means for receiving a value for the power level of a signal to be transmitted from the first station to the second station from said second station; and means for comparing the value estimated at said first station with the value transmitted from the second station and based on said comparison, said first station is arranged, if appropriate to send a signal to said second station indicative that second station switching is to take place.

* * * * *